US007443962B2

(12) United States Patent  
Basu (10) Patent No.: US 7,443,962 B2
(45) Date of Patent: Oct. 28, 2008

(54) SYSTEM AND PROCESS FOR SPEAKING IN A TWO-WAY VOICE COMMUNICATION WITHOUT TALKING USING A SET OF SPEECH SELECTION MENUS

(75) Inventor: Sumit Basu, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1128 days.

(21) Appl. No.: 10/700,803

(22) Filed: Nov. 3, 2003

(65) Prior Publication Data

US 2005/0094781 A1 May 5, 2005

(51) Int. Cl.
*H04M 11/06* (2006.01)
(52) U.S. Cl. ............. 379/88.18; 379/88.04; 379/88.13; 455/418; 704/270
(58) Field of Classification Search ............. 379/88.04, 379/88.13, 88.18; 704/270, 270.1, 258, 276; 455/418
See application file for complete search history.

(56) References Cited

U.S. PATENT DOCUMENTS 6,823,184 B1 * 11/2004 Nelson ................ 455/418

OTHER PUBLICATIONS

Nelson, L., S. Bly, and T. Sokoler, Quiet calls: Talking silently on mobile phones, *Proc. of the SIGCHI Conf. on Human Factors in Computing Systems*, 2001, Seattle, WA, pp. 174-181.

* cited by examiner

*Primary Examiner*—Gerald Gauthier
(74) *Attorney, Agent, or Firm*—Lyon & Harr, LLP; Richard T. Lyon (57) ABSTRACT

A system and process for enabling a communication device having computing capability, a user interface and display, to conduct two-way voice communications between a user and a remote party over a communication link in such a manner that the remote party speaks but the user does not, is presented. In general, a series of menus listing potential responses is displayed on the display of the communication device. In addition, there are a plurality of backchanneling responses provided that the user can select. These responses are employed by the user to communicate with the remote party, rather than speaking. This is accomplished by the user selecting one of the available responses. Once a selection has been made, a pre-recorded voice snippet corresponding to the selected response is accessed. The accessed voice snippet is then played back and transmitted to the remote party over the communication link.

39 Claims, 4 Drawing Sheets

SYSTEM AND PROCESS FOR SPEAKING IN A TWO-WAY VOICE COMMUNICATION WITHOUT TALKING USING A SET OF SPEECH SELECTION MENUS

BACKGROUND

1. Technical Field

The invention is related to two-way voice communications, and more particularly to a system and process for conducting two-way voice communications between a user and a remote party over a communication link using a communication device having a user interface and a display, where the remote party speaks but the user does not 2. Background Art The use of mobile voice communication devices, such as cell phones, is commonplace today. However, answering a call is not possible in some situations where the user cannot speak out loud, such as in a meeting, library, restaurant, and the like. However, the call may be important and require immediate attention. This quandary has led to scenarios such as placing a cell phone in silent mode so that it vibrates instead of producing an audible call alert. When the phone vibrates indicating a call is coming in, the user will often excuse himself or herself, and either move to a location where they can talk, or answer the phone and tell the caller they will call back. Regardless, the result is that people around the user are disturbed by either action. For example, in the case of a meeting, the absence of the user to attend to a call, or even a brief pause while the user tells the caller he or she will call back, can break the cadence of the discussions and result in wasting valuable time. Thus, there is a need for a way of answering a call in such situations and carry on at least a rudimentary conversation with the caller to ascertain what the call is about or make arrangements to talk later, without disrupting people in the surroundings. In other words, to provide some way of communicating with the calling party without talking.

There are some existing systems primarily designed for speech impaired individuals that allows them to answer a call, and using a computer and its keyboard, type in responses to the caller's queries. These systems are generally referred to a Text-to-Speech (TTS) systems. In these systems, the typed responses are used to generate synthesized speech, which is transmitted to the calling party. However, such a scheme is too time consuming to carry on seamless conversations, and is impractical for use with mobile voice communication devices such as cell phones. The present invention resolves these issues.

SUMMARY

The present invention is directed toward a system and process for enabling a communication device having computing capability, a user interface and in one embodiment a display, to conduct two-way voice communications between a user and a remote party over a communication link in such a manner that the remote party speaks but the user does not. In general, a series of menus listing potential responses is displayed on the display of the communication device. These responses are employed by the user to communicate with the remote party, rather than speaking. This is accomplished by the user selecting one of the available responses using the aforementioned user interface. For example, if the communication device is a cell phone, the user interface could be the typical keypad found on these devices. In such a case, the responses in a displayed menu can be associated with different keys on the keypad so that when the user depresses the key assigned to a desired response it is selected. To aid in this process, the number or symbol associated with a key can be displayed adjacent to the response in the menu. The same keys could be used for different responses, but in different menus since typically only one menu would be displayed at a time. Once a selection has been made, a pre-recorded voice snippet corresponding to the selected response is accessed. These voice snippets, which will be described shortly, can be stored in a memory of the communication device, or if the communication link is provided by a service provider, the voice snippets could be stored in a memory belonging to the provider. In this latter case, the provider would monitor the user's selections when the present system and process is activated and access the corresponding voice snippet. In either case, the accessed voice snippet is played back and transmitted to the remote party over the communication link.

In regard to the series of menus, these are hierarchical in nature in that they contain some open ended responses that when selected cause a next menu to be displayed in lieu of the current menu, and so on until a complete statement has been accessed and transmitted in the proper sequence. Other response choices in these menus are not open ended and complete a statement when selected. In such a case, a new follow-on menu is not displayed. Further, the user can enter a "back" command that for most of the menus causes the menu that was displayed immediately before the current menu to be displayed once again. This can be done either before or after a selection has been made from the current menu. In this way, the user can end a statement without choosing a follow-on word or phrase from a subsequent menu, or if the selected response from the current menu completes the desired statement, the user can employ the back command to return to a previous menu in order to continue the conversation along a different path. An example of a response that could be included in one of the menus is an explanation that the user is talking to the other party using a two-way voice communications system and process where the user responds by initiating the playback of voice snippets rather than talking directly. For example, the voice snippet might say "I am talking to you using an interactive response system. I can hear you but can only answer yes/no questions". Other examples will be provided in the detailed description section of this specification.

In addition to the hierarchical menus, a plurality of backchanneling responses are provided that the user can select for the most part at any time regardless of what menu is being displayed. These responses can include such statements as "Yes", "OK", "No", "Uh-huh", and "What?", and are designed to answer simple yes/no questions or carry the conversation forward. The backchanneling responses may or may not be displayed depending on the size and capacity of the display of the communication device. In the case of a cell phone, many units have displays limited to as little as six lines of text. In such cases, the backchanneling responses are not typically displayed to allow more response choices in the hierarchical menus. However, the backchanneling responses are statically mapped in that each is assigned to a single key of the keypad and can be selected most of the time by depressing that key regardless of what menu is displayed. In other words the key is reserved for that backchanneling response. The only exception is the case where the number of keys is extremely limited (e.g., some cell phone keypads have only 12 leys available) and most or all are needed for one of the hierarchical menus (e.g., such as a menu where the numbers 1-12 are the response choices).

The above-described system and process for conducting two-way voice communications can be activated in a number of ways. It can be activated manually by the user, as well as deactivated manually when the user no longer desires to speak using the present system. The system and process can also be configured to activate automatically whenever a voice communication is initiated by the user or a communication is received, or both. Another possibility in the case of a cell phone is to automatically activate the system, but only if the cell phone is set to silent mode.

As for the pre-recorded voice snippets, these can be "canned" in that they are recorded by someone other than the user. Alternately, the user can record voice snippets in their own voice. If the user's voice is to be used, the voice snippets must be recited by the user and recorded. This is accomplished by activating a training mode. Once a user has activated the training mode, a designation is made indicating which of the responses the user intends to record a voice snippet for. The user then recites the response and his or her voice is recorded. This voice recording is assigned to the menu associated with the designated response as the voice snippet for that response and is stored for future playback, in the ways described earlier. In one embodiment the user can also enter response choices of their own in menus with unused response locations. This procedure also starts with the user initiating the training mode. However, this time the user enters the text of a response he or she intends to record a voice snippet for. The inputted text is assigned to an unused response location of the menu under consideration and a recording is made of the voice of the user reciting the inputted response. As before, this voice recording is assigned to the menu associated with the response as the voice snippet for that response. It is then stored for future playback. The voice snippets can correspond exactly to the text of its associated response as displayed, or it can simply convey the content of the text but not mirror it exactly. In addition, if space on the display is very limited, the text of a response can represent an abbreviation of the words recorded in the corresponding voice snippet.

It is noted that the pre-recorded voice snippets could be in a different language than that of the text of the response displayed on the communication device. Further, multiple pre-recorded voice snippets corresponding to a selected response can be made available, each of which is in a different language. In such a case, the user selects the language of the voice snippet that is to be accessed prior to selecting the response.

Another aspect of the present two-way voice communication system and process is that whenever a user selects a menu or backchanneling response and then subsequently selects another menu or backchanneling response prior to the former response being completely played back, the playback of the former response is terminated and a playback of the latter response is transmitted instead. In this way the user can cut-off responses, especially long ones, if desired. In addition, the communication device can include a manual cancel feature that when selected by the user cuts off a response then being transmitted. For example, in the case of a cell phone, its cancel key might be employed for this purpose.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
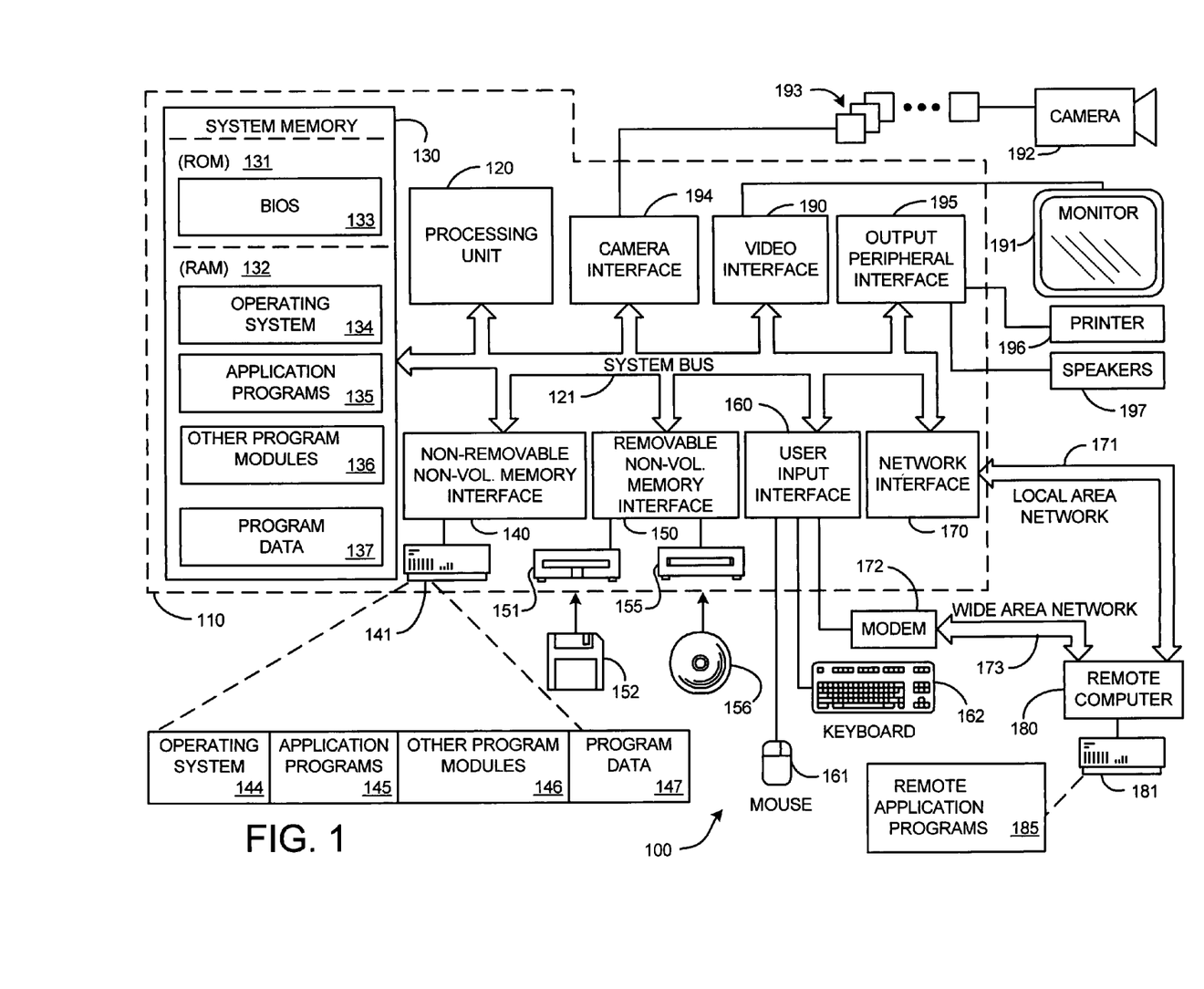
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, cellphones, personal digital assistants (PDAs), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in many method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A microphone array 192, and/or any number of individual microphones (not shown) are included as input devices to the computer 110. The signals from the microphone array 192 (and/or individual microphones if any) are input into the computer 110 via an appropriate audio interface 194. This interface 194 is connected to the system bus 121, thereby allowing the signals to be routed to and stored in the RAM 132, or one of the other data storage devices associated with the computer 110.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Two-Way Voice Communication System and Process

The exemplary operating environment having now been discussed, the remaining part of this description section will be devoted to a description of the program modules embodying the invention. Generally, the system and process according to the present invention allows a user to respond in any two-way voice communication scenario employing a communication device having a user interface and a display without having to speak. Instead of speaking, the user employs the interface to select response choices, which cause pre-recorded voice snippets to be played back over the communication link to the other remote party or parties taking part in the conversation. The response choices are presented to the user in the form of a series of menus displayed on the aforementioned display of the communication device. The aforementioned two-way voice communication scenario includes telephony, teleconferencing, radio-based or computer network-based voice communications (e.g., IP call and voice chat). The communication device can be a "smart" phone (i.e., a wired or wireless telephone with computing capabilities), cell phone, PDA or other handheld computing device with a connection to a computer network, or a PC, among others. The user interface can be a standard keypad or keypad-like device, or a computer keyboard. The interface can also be any type of pointing device (e.g., computer mouse, trackball, joystick, and the like) that is used to point to desired selections on the communication device's display.

While the present two-way voice communication system and process can be implemented in any or the foregoing communication scenarios and employ any of the aforementioned communication devices, it provides particular advantages in connection with cell phones. Cell phones typically have a keypad entry device and a display, and being able to communicate in a cell phone scenario without speaking can be quite useful. For example, imagine the following scenario. The user is in a meeting, and cannot talk out loud without disturbing the other participants. However, the user sets his or her cell phone to vibrate when an incoming call is received. The user can then answer the call using a headset or other listening device that cannot be heard by others in the meeting room. The user then activates the present system (or it is set to automatically initiate when a call is received as will be explained later). The user can then hear the person calling and can communicate with that person by selecting the appropriate response from the aforementioned menus. More particularly, for each menu accessed by the user, the cell phone display shows a series of short messages along with numbers corresponding to keys on the phone's keypad. The user selects an appropriate response by pressing the associated number on the keypad. The voice snippet corresponding to that selection is then played to the calling party. It is noted that the situation could be reversed as well where the user makes the call and initiates the conversation with the called party by selecting and playing an appropriate voice snippet.

In the description to follow, it will be assumed that the two-way voice communication system and process according to the present invention has been implemented in a cell phone having a keypad and a display large enough to display at least 6 lines of text. In addition, it will be assumed that the other party or parties in the voice communication with the cell phone user are callers, even though the system and process would operate just as well if the user had initiated the call. While these assumptions are made to facilitate the description of the present system and process, it is not intended that it be limited to such a communication scenario. Rather, the system and process could be implemented just as readily in any of the other previously described two-way voice communications scenarios as well.

Figure 2:
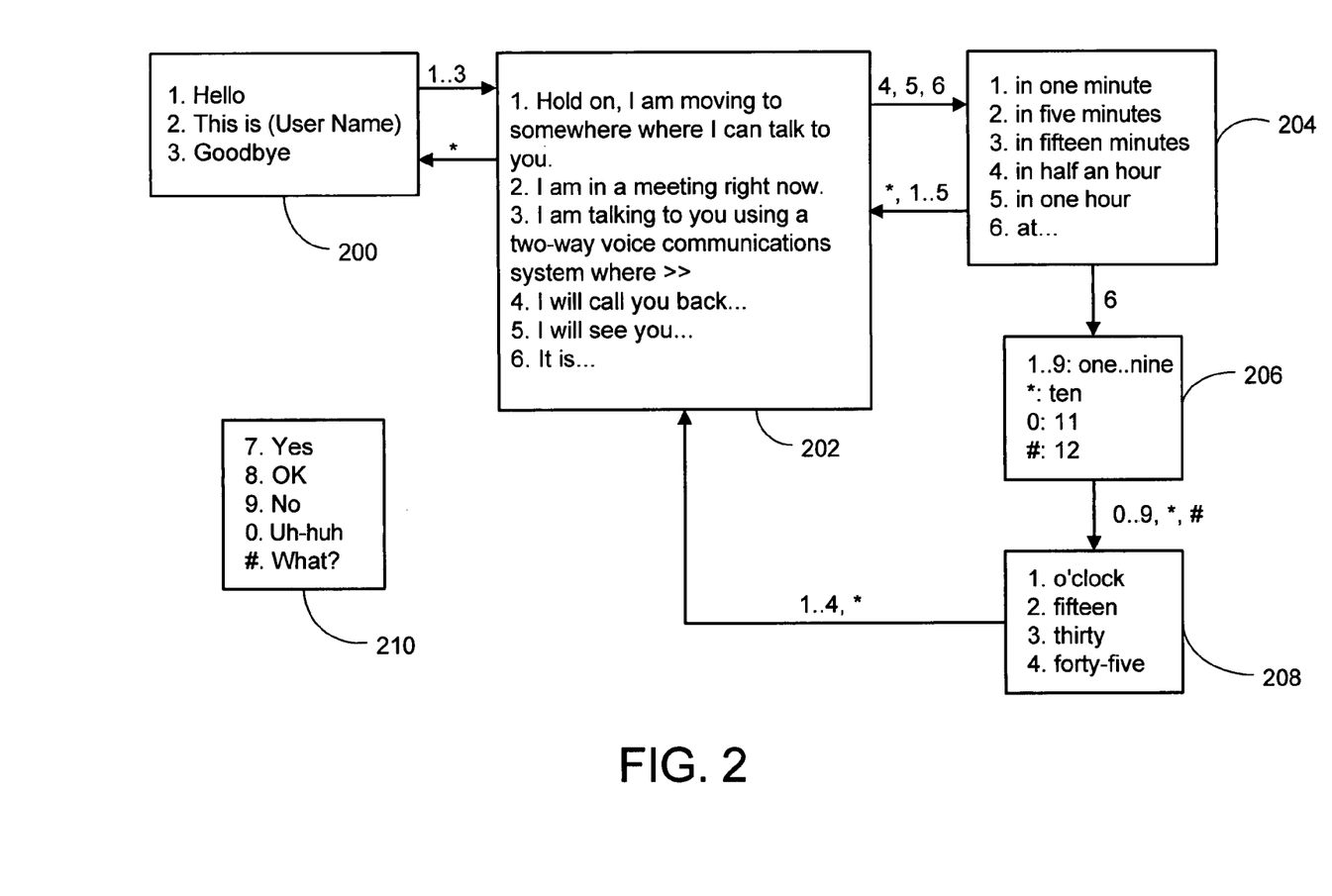
FIG. 2 is a block diagram depicting an exemplary embodiment of the hierarchical and statically mapped menus of the two-way voice communication system and process according to the present invention.

The aforementioned menus include response choices that in essence allow the user to explain the situation and respond to simple queries. For example, the user can play a voice snippet that explains to the other party that he or she is answering using the present system, answer yes/no questions, or tell the other party he or she will call back, among other things. More particularly, in one embodiment of the present two-way voice communication system and process, the menus depicted in FIG. 2 are employed by the user to respond. The menus include a series of hierarchical menus and a statically mapped menu. In the hierarchical menus, the numbers associated with the various responses depend on the currently active menu. For example, the number "1" would cause a different response to be played in each of the different menus. Conversely, the numbers assigned to the statically mapped menu do not change and the same response is provided whenever that number is selected, with one exception that will be discussed shortly.

The two-way voice communication system and process can be initiated in a variety of ways. In one embodiment, the system is manually activated by the user. For example, when a call is made or received, user would be presented with an option to activate the system. In another embodiment, the two-way voice communication system and process is initiated automatically when a call is made or received. In such a case, if the user does not wish to employ the system, he or she could simply speak instead of selecting from the menus. In a variation of this embodiment the system is activated automatically when a call is made or received, but only if the cell phone has been set to "silent" mode. The fact that the phone is in silent mode indicates the user's desire that it not ring and disturb other in the area, and so the initiation of the system is appropriate. Conversely, when the cell phone is not in silent mode, thereby indicating that the user does not wish to use the present two-way voice communication system and process, the cell phone operates in its normal mode freeing the display for uses not related to the present system. Of course, even if the system is automatically initiated, the user has the option to deactivate it and free the display.

In regard to the hierarchical menus in the example embodiment of FIG. 2, the first menu is the greeting/closure menu 200. This menu is shown in the display of the communication device as the default menu when the two-way voice communication system and process is first activated. In the example embodiment shown in FIG. 2, the greeting/closure menu 200 has a list of three numbered response choices—namely:

1. Hello;
2. This is (user's name); and
3. Goodbye.

The selection of any of these three choices automatically causes the second menu 202, which is referred to as the base menu, to be displayed on the communication device in lieu of the greeting/closure menu 200. Generally, the numbered response choices listed in the base menu 202 are typical follow-on statements to a response chosen in the greeting/closure menu 200 and which form the basis for further conversation. For example, in the embodiment depicted in FIG. 2, there are six possible responses that can be chosen. These are:

1. Hold on, I am moving to somewhere where I can talk to you.
2. I am in a meeting right now.
3. I am talking to you using an interactive response system. I can hear you, but I can only answer yes/no questions.
4. I will call you back . . .
5. I will see you . . .
6. It is . . .

The ". . ." extension in response choices 4, 5 and 6 refers to a continuation of the response in a manner selected from the third menu 204, referred to as the time specification menu. If the user selects any of the first three response statements in the second menu 202, the corresponding voice snippet is played, but the menu displayed does not change. The user then has the option to select another of the statements from the second menu 202, or select a prescribed "back" key on the keypad, which in tested embodiments was the star (*) key. As indicated in FIG. 2, selecting the star key returns the user to the menu immediately preceding the currently displayed menu. Thus, if the user selects the star key while viewing the base menu 202, the greeting/closure menu 200 would be displayed in its stead. The backtracking could, for example, be employed to access the "goodbye" voice snippet in the greeting/closure menu 202. In addition the ability to go back to a previous menu allows the user to end a statement without including the additional information found in subsequent menus. For example, the user might wish to simply say "I will call you back" and not specify a time. This is accomplished using the menus illustrated in FIG. 2, by selecting number 4 when the base menu 202 is displayed, and then selecting the star symbol to return to the base menu without saying more. The ability to backtrack through the menus also allows the user to correct errors, such as when the wrong number is selected. It is noted that the present two-way voice communication system and process can include a feature whereby starting one voice snippet stops the previous one, allowing for an implicit "cancel" mechanism, especially for long snippets. Thus, if a user selects the wrong response or decides for whatever reason to say something else, he or she can backtrack to the menu having the desired replacement statement and select it. This cuts off the voice snippet being played and starts the snippet associated with the new choice instead. In addition, the present system and process can be configured to include a manual cancellation feature that when selected by the user ends the transmission of a voice snippet, for similar reasons as described above. The cancel button found on many current cell phones could be used to implement this feature, although any other button or selectable displayed icon can be used instead as desired. In yet another embodiment of the cancellation feature, the present system and process can be configured so that whenever the aforementioned back key is pressed any snippet currently being played in cut off. In this embodiment if the user wishes to go back to previous menu and not cut off the voice snippet then being played, he or she must wait until the snippet is finished before selecting the back key.

Referring again to FIG. 2, if the user selects response choices 4, 5, or 6 in the base menu 202, the time specification menu 204 is displayed in lieu of the base menu in the display of the communication device. Various typical time periods are listed in the time specification menu 204, as can be seen in FIG. 2 (i.e., choices 1-5 in the example shown). When the user chooses one of these time periods by pressing the corresponding number on the keypad of the communication device, the statement begun when one of the open ended responses in the base menu 202 was selected, is now completed. For example, suppose the user selected the response assigned to number 4 in the base menu 202. When the user presses the number 4 key on the keypad of the communication device, the voice snippet "I will call you back" is played and the time specification menu 204 is displayed. Now suppose the user selects the time period assigned to number 3 in the time specification menu 204. This results in a voice snippet being played that says "in fifteen minutes". Accordingly, the other person in the communication hears the full statement "I will call you back in fifteen minutes".

Once one of the time periods is chosen from the time specification menu 204, in one embodiment, the user is then automatically returned to the base menu 202. The user can begin a new statement from the base menu 202 or could press the star key to go back to the greeting/closure menu 200 to, for example, say goodbye. Another option when the user is viewing the time specification is to forego selecting anything and instead pressing the star key to go back to the base menu for the reasons outlined above. One other option in the time specification menu 204 is to select the open ended "at . . ." response (i.e., number 6 in this example). This causes the associated voice snippet to be played and the hour specification menu 206 is displayed to the user in lieu of the time specification menu 204. In the hour specification menu 206 the numbers 1 through 9 correspond to voice snippets for that number. In addition, the star key in this menu causes a voice snippet saying "ten" to be played, the "0" key corresponds to a voice snippet for eleven, and the pound key (#) on the keypad causes a snippet for twelve to be played. Further, when any of these selections are made, the sub-hour specification menu 208 is displayed to the user on the communication device in lieu of the hour specification menu 206. The sub-hour specification menu 208 contains response choices that complete the previously begun time statements, and as shown in the example menu 208 of FIG. 2, can include:

1. o'clock;
2. fifteen;
3. thirty;
4. forty-five.

When the user selects any of these choices, the corresponding voice snippet is played and the base menu 202 is once again displayed on the communication device to facilitate further conversation. In addition, when the user is viewing the sub-hour specification, he or she can select the star key. In that case, the base menu is displayed without anything further being played.

Given the foregoing hierarchical menus, an example of a complete statement that a user could make using the present two-way voice communication system and process is "I will call you back at 11 o'clock". To accomplish this using the example menus shown in FIG. 2, the user would first select number 4 in the base menu 202 when that menu is displayed. This selection is then followed by a selection of number 6 from the subsequently displayed time specification menu 204 and number 0 from the next displayed hour specification menu 206. Finally, the user selects number 1 when the sub-hour menu is displayed.

It is noted that while the foregoing example hierarchical menus are advantageous in that they allow the user to inform a caller of the use of the present system, and to specify times to meet or call, other menus with different purposes can be constructed as appropriate for the application of the system. It is not intended that the present invention be limited to just the menus illustrated in FIG. 2. Rather, in general, any set of hierarchical menus can be employed with the goal of allowing a user to formulate statements appropriate for the application, and which are played to a caller in order to carry on a voice communication without the user actually having to talk.

In addition to the hierarchical menus, the present two-way voice communication system and process also includes a statically mapped menu as indicated previously. The statically mapped menu essentially contains a series of short responses that allow the user to answer questions posed by the caller with a yes or no, and others of the type typically used by someone in a voice communication to acknowledge a speaker. In other words, short responses that tend to facilitate the continuance of the conversation in a seamless way. These types of responses are sometimes referred to as backchanneling responses as they provide immediate feedback to the speaker. This is possible because as soon as the user selects one of these responses, its corresponding voice snippet is played back to the caller. For example, in the statically mapped menu 210 shown in FIG. 2, these backchanneling responses include the following 7. Yes;
8. OK;
9. No;
0. Uh-huh; and
. What?

Here again other similar responses can be employed instead or in addition to foregoing list.

The menu 210 is called a statically mapped menu as the responses are for the most part mapped to certain numbers or symbols, and do not change. Thus, these responses are available to the user at any time without having to navigate through the hierarchical menus, and regardless of the menu currently displayed on the communication device. The only exception is a menu such as the hour specification menu 206, which requires the use of all the keypad buttons when it is active. The statically mapped menu 210 can be displayed by the user selecting the back key whenever the greeting/closure menu 200 is displayed, as indicated in FIG. 2. However, it is envisioned that with practice the user will memorize the keys associated with the statically mapped responses and will not need to consult a display of the menu 210. Finally, it is noted that the user would select the back key again to return to a display of the greeting/closure menu 200 whenever the statically mapped menu 210 is displayed.

In tested versions of the present two-way voice communication system and process, there were no more than six items per menu. This has two purposes. First, communications devices such as cell phones currently have display screens that are very limited in the amount of information that can be displayed and still be legible to the user. It was found this amounted to about 6 responses if they were short. It is noted that longer responses can be represented by simply displaying a short abbreviation representing the corresponding voice snippet. For example, the first few words of the response would be displayed to remind the user of the full response that is provided when the corresponding voice snippet is played. If the particular communication device the user is employing has a display that has a greater capacity that current cell phones, then more choices could be displayed if desired. However, there is another reason for limiting the number of responses displayed in any one menu to about six as in the tested embodiment. Essentially, to carry on a conversation using the present system and process, the user must be able to quickly access menus and scan the responses available. It was found that having more than about six choices bogged down this process and made it more difficult for the conversation to seem to the other party as flowing and seamless.

In regard to the voice snippets several options exist. First, the voice snippets can be stored locally in the memory of the communication device, or if this is not desired or the memory is too limited, the voice snippets can be stored in a memory associated with a service provider, such as a cell phone service provider. In the first case, the voice snippet would be played straight from the memory of the communication device by transmitting it via the communication link to the other party (or parties as the case may be). In the latter case, the service provider would monitor the user's device looking for a keypad selection—for example by monitoring DTMF tones from the keypad. Once a selection is made the service provider would transmit the associated stored snippet to the other party or parties.

The voice snippets can be "canned" in that they are recorded by someone who is not the user of the communication device, and are provided with or accessed using the present system and process. In this case the voice snippets would be made to correspond with the text of the menu listing or at least correspond to what an abbreviated menu listing represents should the entire text of the snippet be too long to display on the communication device. In regard to "canned" voice snippets, the user could choose whether the voice is male or female, or the voice of the person in the snippets could be that of a celebrity.

It is also noted that the language spoken by the speaker in the voice snippet could be selectable by the user, and the text of the menu items could correspond to the language of the speaker in the snippets, or the text could be in another language. In this way, for example, a user who understood the language of a caller could respond in the caller's language, even though the menu items are in a different language such as English. Further, the voice snippets could be provided in several languages and the user could choose which is played when a menu item is chosen.

Figure 3:
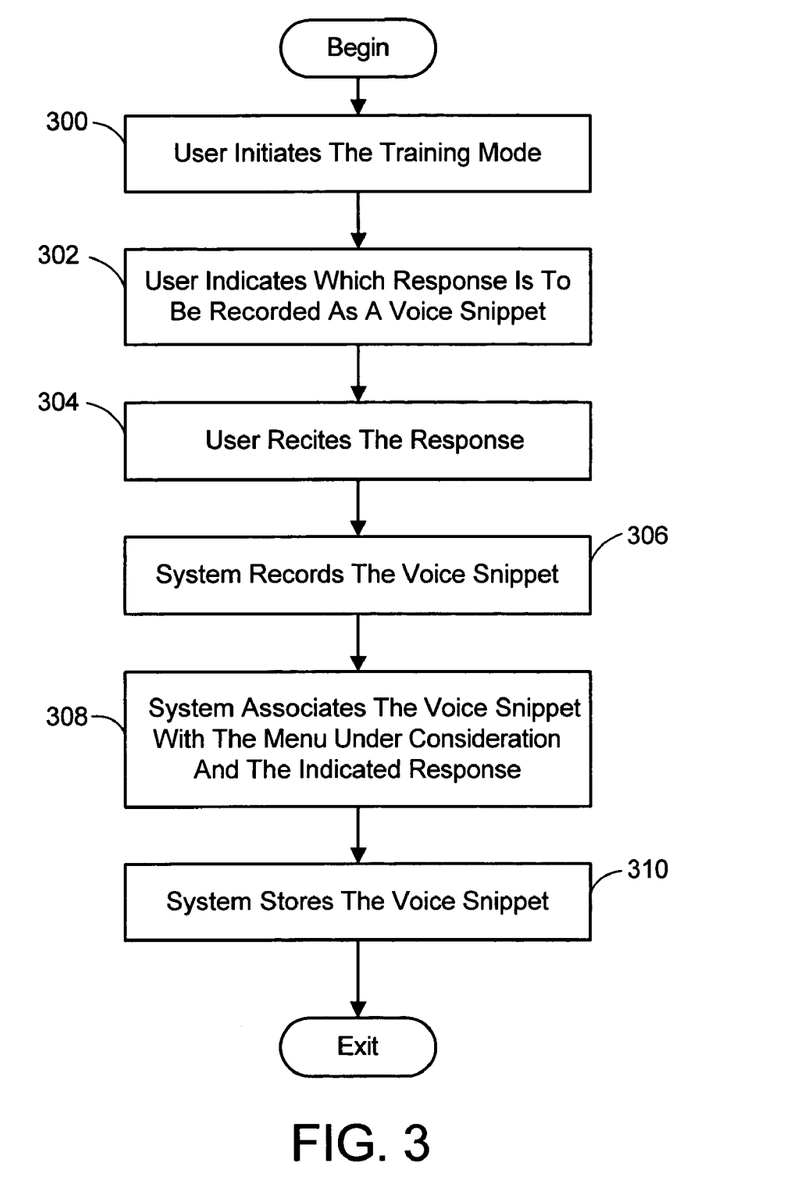
FIG. 3 is a flow chart diagramming a process for recording voice snippets associated with prescribed responses according to the present invention.

Alternately, the user can record their own voice for use as the snippets so it sounds to the other person in the communication like the user is responding in his or her own voice. Referring to FIG. 3, this is accomplished in one embodiment of the present two-way voice communication system and process by initiating a training mode (process action 300) via an arbitrary prescribed method. The user then would indicate which response is to be recorded as a voice snippet (process action 302), by for example selecting the response using the communication device. The user next recites the response (process action 304), which is recorded (process action 306), associated with the menu under consideration and the indicated response (process action 308), and stored (process action 310) by the system via one of the methods described previously. In regard to the user reciting the response, it could be read directly from the menu as displayed on the communication device if it is short enough to be displayed in its entirely on the device. Alternately, it could be read from a separate script provided with the system. In the foregoing embodiment of the system, it is not required that the voice snippet recorded by the user correspond exactly with the displayed text or script, but should at least convey the same meaning so as to maintain the necessary correspondence.

Figure 4:
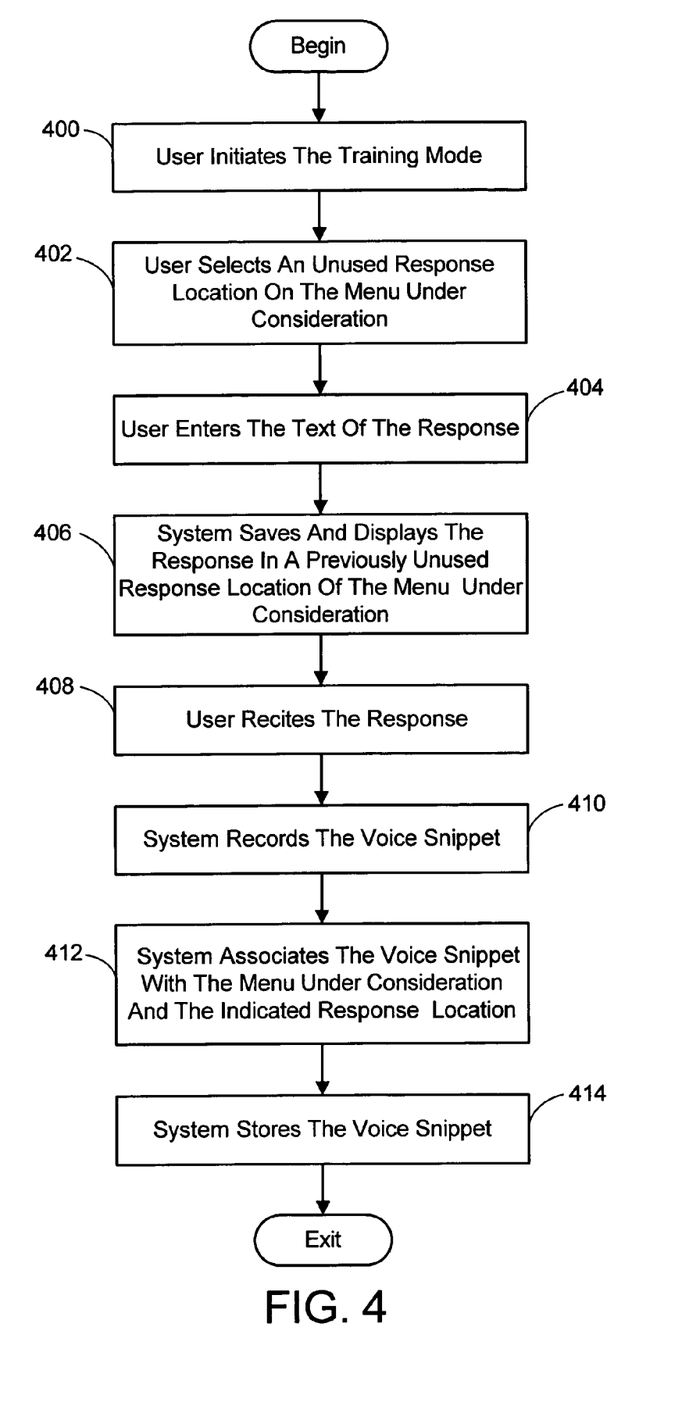
FIG. 4 is a flow chart diagramming a process for recording voice snippets for free-form responses created by the user according to the present invention.

While the text of the voice snippets is generally prescribed for the available choices in each menu, it is possible to include one or more "free form" selections where a user would record a custom voice snippet and enter via conventional means representative text that would be displayed for that choice in the menu under consideration. More particularly, referring to FIG. 4, this variation is accomplished in one embodiment of the present system and process by initiating the training mode (process action 400), and then selecting an unused response location on a menu under consideration (process action 402). The user then enters the text of the response (process action 404), which would be saved and displayed in the previously unused response location of the menu (process action 406). The user next recites the text of the response (process action 408), which is recorded as a voice snippet (process action 410), associated with the menu under consideration and the indicated response location (process action 412), and stored (process action 414). Here again, it is not required that the voice snippet recorded by the user correspond exactly with the displayed text or script, but should at least convey the same meaning so as to maintain the necessary correspondence.

The present two-way voice communication system and process has many advantageous applications other than it uses for personal voice communication as described above. For example, the system and process is ideal for assisting a person with speech disabilities or temporary speaking problems such as from a sore throat or laryngitis. Another advantageous application exists in the security field where security personnel can listen to instructions and respond silently so that persons around them are not able to overhear. Similarly, when a person does not want to give away their position, the present system and process can be used. For example suppose a user wants to report a break-in into their home without alerting the intruder to their presence or location. Using the present system could allow that person to call for help without speaking. Another advantageous use of the system is where the user does not want others in the area to hear what is being said to avoid embarrassment or to preserve the confidentiality of the conversation. Still further, in addition to the present invention being advantageous in situations where the user does not want to disturb others in the area (e.g., in conference room, library, or crowded office) as described above, it can also be advantageously employed in places that are too noisy for normal two-way voice communications.

3.0 Alternate Configurations

While the invention has been described in detail by specific reference to preferred embodiments thereof, it is understood that variations and modifications thereof may be made without departing from the true spirit and scope of the invention. For example, in the foregoing description the display of the communication device was used to display the various hierarchical and statically mapped menus. However, if the communication device does not have a display, or the menus are too complex to display on the display available on the communication device, it is possible to implement the present system and process without the use of the display. In this alternate configuration, the menus would be printed on a card or sheet of paper, or the like. The user would then select responses based on the keys indicated on the printed media.

Wherefore, what is claimed is:

1. A computer-implemented process for conducting two-way voice communications between a user and a remote party over a communication link using a communication device having a user interface and a display, wherein the remote party speaks but the user does not, comprising using a computer to perform the following process actions:

displaying a menu listing a plurality of potential responses on the display of the communication device, said responses being employed by the user to communicate with the remote party; and displaying at least one additional menu on the display of the communication device upon selection of a response from a currently displayed menu, which together with the original menu form a hierarchy of menus used to construct a complete statement when selected responses from each menu displayed are played back in the sequence they were selected; and upon selection of two or more responses used to construct said complete statement by the user employing the user interface of the communication device,
  accessing pre-recorded voice snippets corresponding to the selected responses, and
  transmitting a playback of the accessed voice snippets to the remote party over the communication link.

2. The process of claim 1, further comprising the process actions of:
  providing a plurality of backchanneling responses which are selectable by the user via the user interface; and,
  upon selection of one of the backchanneling responses by the user,
    accessing a pre-recorded voice snippet corresponding to the selected backchanneling response, and
    transmitting a playback of the accessed voice snippet to the remote party over the communication link.

3. The process of claim 2, wherein the backchanneling responses comprise at least one of (i) Yes, (ii) OK, (iii) No, (iv) Uh-huh, and (v) What?.

4. The process of claim 1, wherein the process for conducting two-way voice communications is activated manually by the user.

5. The process of claim 1, wherein the process for conducting two-way voice communications is activated automatically whenever a voice communication is initiated by the user.

6. The process of claim 1, wherein the process for conducting two-way voice communications is activated automatically whenever a voice communication is received by the user.

7. The process of claim 1, wherein once activated, said the process for conducting two-way voice communications can be deactivated manually by the user.

8. The process of claim 1, wherein the process action of accessing a pre-recorded voice snippet corresponding to the selected response comprises accessing a voice snippet recorded by someone other than the user.

9. The process of claim 1, further comprising the process actions of allowing the user to record voice snippets in their own voice.

10. The process of claim 9, wherein the process action of allowing the user to record voice snippets in their own voice, comprises the actions of:
  inputting a command entered by the user via the user interface to initiate a training mode;
  inputting a designation of which of the responses the user intends to record a voice snippet for;
  recording the voice of the user reciting the designated response;
  assigning the voice recording to the menu associated with the designated response as the voice snippet for that response; and
  storing the voice snippet for future playback.

11. The process of claim 10, wherein the process action of allowing the user to record voice snippets in their own voice, comprises the actions of:

inputting a command entered by the user via the user interface to initiate a training mode;
inputting the text of a response the user intends to record a voice snippet for which is entered by the user via the user interface;
assigning the inputted text to an unused response location of the menu;
recording the voice of the user reciting the inputted response;
assigning the voice recording to the menu associated with the inputted response as the voice snippet for that response; and
storing the voice snippet for future playback.

12. The process of claim 1, wherein the voice snippets correspond exactly to the text of its associated response as displayed.

13. The process of claim 1, wherein the voice snippets convey the content of the text of its associated response as displayed, but do not mirror the text exactly.

14. The process of claim 1, wherein the text of a response as displayed represents an abbreviation of the words recorded in the corresponding voice snippet.

15. The process of claim 1, wherein the hierarchy of menus comprises a first menu comprising responses representing greetings.

16. The process of claim 15, wherein the hierarchy of menus further comprises a second menu comprising responses representing the basis for further conversation.

17. The process of claim 16, wherein the responses available in the second menu comprise a response that the user is talking to the other party using a two-way voice communications process wherein the user responds by initiating the playback of voice snippets rather than talking directly.

18. The process of claim 16, wherein the responses available in the second menu comprise open ended responses which when selected by the user cause a first additional menu to be displayed which comprises responses that are selected to continue or complete the open ended response selected in the second menu.

19. The process of claim 18, wherein in lieu of or after selecting a non-open ended response from a displayed menu, the user can select a back command via the user interface, and wherein whenever the user selects the back command, performing the actions of:
inputting the back command; and
displaying the menu displayed immediately before the current menu in lieu of the currently displayed menu.

20. The process of claim 18, wherein the first additional menu comprises responses representing the specification of a time.

21. The process of claim 20, wherein the first additional menu comprises an open ended response which when selected by the user causes a second additional menu to be displayed which comprises responses that are selected to continue or complete the open ended time specification response selected in the first additional menu.

22. The process of claim 21, wherein the second additional menu comprises open ended responses which whenever selected by the user cause a third additional menu to be displayed which comprises responses that are selected to complete the open ended time specification response selected in the second additional menu.

23. The process of claim 22, further comprising and action of, whenever a response is selected from the third additional menu to complete a time specification statement, displaying the second menu in lieu of the third additional menu.

24. The process of claim 23, wherein in lieu of selecting a response from the third additional menu, the user can select a back command via the user interface, and wherein whenever the user selects the back command, performing the actions of:
inputting the back command; and
displaying the second menu in lieu of the third additional menu.

25. The process of claim 1, wherein the process action of accessing a pre-recorded voice snippet corresponding to the selected response, comprises an action of accessing a pre-recorded voice snippet in a language other than that of the text of the response as displayed.

26. The process of claim 25, wherein a plurality of pre-recorded voice snippets corresponding to a selected response are available, each of which is in a different language, and wherein the user can select the language of the voice snippet that is accessed prior to selecting the response.

27. The process of claim 16, further comprising the process actions of:
providing a plurality of backchanneling responses which are selectable by the user via the user interface;
displaying a menu of the backchanneling responses whenever the user selects a back command via the user interface when the first menu is displayed in the display of the communication device; and
upon selection of one of the backchanneling responses by the user,
accessing a pre-recorded voice snippet corresponding to the selected backchanneling response, and
transmitting a playback of the accessed voice snippet to the remote party over the communication link.

28. A system for conducting two-way voice communications between a user and a remote party wherein the remote party speaks but the user does not, comprising:
a communication device comprising a computing device, a user interface and a display, wherein the communication device is capable of establishing a communication link between the user and the remote party;
a computer program comprising program modules executable by the computing device, wherein the computing device is directed by the program modules of the computer program to,
display a menu listing a plurality of potential responses on the display of the communication device, said responses being selectable by the user via the user interface, and
upon selection of one of the responses by the user,
access a pre-recorded voice snippet corresponding to the selected response, and
transmit a playback of the accessed voice snippet to the remote party over the communication link.

29. The system of claim 28, wherein the communication device comprises a cell phone, the user interface comprises a keypad of the cell phone, and the display comprises a display of the cell phone.

30. The system of claim 29, wherein the program module for displaying the menu listing the plurality of potential responses comprises a sub-module for displaying adjacent to each response a number or symbol each of which corresponds to a different one of the keypad buttons, and wherein the user selects a response from the menu by depressing the corresponding button on the keypad.

31. The system of claim 29, wherein the keypad comprises a cancel button, and wherein the computer program further comprises a program module for terminating the playback of a voice snippet whenever a user activates the cancel button.

32. The system of claim 28, wherein the display of the communication device is limited to displaying six response choices.

33. The system of claim 28, wherein the communication device further comprises a memory for storing the voice snippets associated with each response, and wherein the program module for accessing the pre-recorded voice snippet corresponding to the selected response, comprises a submodule of accessing the voice snippet from the cell phone memory.

34. The system of claim 28, wherein the communication link is provided by a service provider, and wherein the voice snippets are stored on a memory of a computing device controlled by the service provider, and wherein the program module for accessing the pre-recorded voice snippet corresponding to the selected response comprises the service provider accessing the voice snippet from the memory of the service provider's computing device, and wherein the program module for transmitting the playback of the accessed voice snippet to the remote party over the communication link comprises the service provider transmitting the playback of the voice snippet.

35. The system of claim 29, wherein the cell phone has a silent mode wherein the user is alerted to an incoming call by vibration of the cell phone, and wherein the system for conducting two-way voice communications is activated automatically whenever a voice communication is received by the user and the cell phone is in silent mode.

36. The system of claim 29, further comprising program modules for:
    associating each of a plurality of backchanneling responses to a different button of the keypad which are selectable by the user via the keyboard; and,
    upon selection of one of the backchanneling responses by the user depressing the corresponding key on the keypad,
        accessing a pre-recorded voice snippet corresponding to the selected backchanneling response, and
        transmitting a playback of the accessed voice snippet to the remote party over the communication link.

37. A computer-readable medium having computer-executable tangible storage medium having computer-executable instructions stored thereon for enabling a communication device having a computing device, user interface and display to conduct two-way voice communications between a user and a remote party over a communication link, wherein the remote party speaks but the user does not, said computer-executable instructions comprising:
    displaying a menu listing a plurality of potential responses on the display of the communication device, said responses being employed by the user to communicate with the remote party;
    displaying at least one additional menu on the display of the communication device upon selection of a response from a currently displayed menu, which together with the original menu form a hierarchy of menus used to construct a complete statement when selected responses from each menu displayed are played back in the sequence they were selected;
    providing a plurality of backchanneling responses which are selectable by the user via the user interface; and,
    upon selection of two or more responses used to construct said complete statement or a backchanneling response by the user employing the user interface of the communication device,
        accessing a pre-recorded voice snippet or snippets corresponding to the selected response or responses, and
        transmitting a playback of the accessed voice snippet or snippets to the remote party over the communication link.

38. The computer-readable medium of claim 37, further comprising an instruction for, whenever a user selects a menu or backchanneling response and then subsequently selects another menu or backchanneling response prior to the former response being completely played back, terminating the playback of the former response and transmitting a playback of the latter response instead.

39. The computer-readable medium of claim 38, further comprising instructions for:
    whenever a user selects a menu or backchanneling response and then subsequently selects a back command via the user interface prior to the former response being completely played back,
    displaying the menu displayed immediately before the current menu in lieu of the currently displayed menu, and
    terminating the playback of the former response.

* * * * *

UNITED STATES PATENT AND TRADEMARK OFFICE
CERTIFICATE OF CORRECTION

PATENT NO. : 7,443,962 B2
APPLICATION NO. : 10/700803
DATED : October 28, 2008
INVENTOR(S) : Sumit Basu It is certified that error appears in the above-identified patent and that said Letters Patent is hereby corrected as shown below:

In column 14, line 4, in Claim 1, after "party;" delete "and".

In column 16, line 18, in Claim 27, delete "claim 16," and insert -- claim 15, --, therefor.

In column 16, line 47, in Claim 28, after "interface," delete "and".

In column 16, line 48, in Claim 28, above "upon selection" insert -- display at least one additional menu on the display of the communication device upon selection of a response from a currently displayed menu, which together with the original menu form a hierarchy of menus used to construct a complete statement when selected responses from each menu displayed are played back in the sequence they were selected, and --.

In column 16, line 48, in Claim 28, delete "one of the" and insert -- two or more --, therefor.

In column 16, line 49, in Claim 28, after "access" delete "a".

In column 16, line 49, in Claim 28, delete "snippet" and insert -- snippets --, therefor.

In column 16, line 51, in Claim 28, delete "snippet" and insert -- snippets --, therefor.

In column 17, lines 41-42, in Claim 37, after "readable" delete "medium having computer-executable".

In column 18, line 34, in Claim 39, delete "claim 38," and insert -- claim 37, --, therefor.

Signed and Sealed this
Tenth Day of May, 2011

David J. Kappos
*Director of the United States Patent and Trademark Office*